(12) United States Patent
Castillo et al.

(10) Patent No.: US 10,421,849 B2
(45) Date of Patent: Sep. 24, 2019

(54) CATALYST COMPLEX AND METHOD OF DEGRADATION OF A POLYMER MATERIAL

(71) Applicant: Ioniqa Technologies B.V., Eindhoven (NL)

(72) Inventors: Sonja Irene-Marie Reginalde Castillo, Eindhoven (NL); Susanne Van Berkum, Eindhoven (NL); Vincent Gertudis Antonius Philippi, Eindhoven (NL); Joost Robert Wolters, Eindhoven (NL)

(73) Assignee: Ioniqa Technologies B.V., Eindhoven (NL)

( * ) Notice: Subject to any disclaimer, the term of this patent is extended or adjusted under 35 U.S.C. 154(b) by 0 days.

(21) Appl. No.: 16/063,410

(22) PCT Filed: Dec. 23, 2016

(86) PCT No.: PCT/NL2016/050920
§ 371 (c)(1),
(2) Date: Jun. 18, 2018

(87) PCT Pub. No.: WO2017/111602
PCT Pub. Date: Jun. 29, 2017

(65) Prior Publication Data
US 2018/0371206 A1    Dec. 27, 2018

(30) Foreign Application Priority Data

Dec. 23, 2015  (WO) ................ PCT/NL2015/050905
Jun. 23, 2016  (NL) ...................................... 2017033

(51) Int. Cl.
*B01J 31/02*       (2006.01)
*C08J 11/18*       (2006.01)
(Continued)

(52) U.S. Cl.
CPC ............... *C08J 11/18* (2013.01); *B01J 31/02* (2013.01); *B01J 31/0284* (2013.01);
(Continued)

(58) Field of Classification Search
USPC ................... 521/48; 528/193, 194, 196, 198
See application file for complete search history.

(56) References Cited

U.S. PATENT DOCUMENTS

2017/0369670 A1*  12/2017  Van Berkum ............ C08J 11/16

FOREIGN PATENT DOCUMENTS

WO    WO 2014/142661 A2    9/2014
WO    WO 2014/209117 A1    12/2014

OTHER PUBLICATIONS

International Search Report and Written Opinion for International Application No. PCT/NL2016/050920, Filed Dec. 23, 2016, dated Apr. 11, 2017.
(Continued)

*Primary Examiner* — Terressa Boykin
(74) *Attorney, Agent, or Firm* — Cook Alex Ltd.

(57) ABSTRACT

A catalyst complex for catalysis of degradation of a polymer material is described. Said complex comprises a magnetic particulate body containing iron oxide at its surface with an average diameter of 150-450 nm, and a plurality of catalytic groups grafted onto the iron oxide surface of the magnetic particulate body, which catalytic groups comprise a bridging moiety and a catalyst entity, wherein the bridging moiety comprises a functional group for adhesion or bonding to the iron oxide surface and a linking group towards the catalyst entity, and wherein the catalyst entity comprises a positively charged aromatic heterocycle moiety, and a negatively charged moiety for balancing the positively charged aromatic moiety.

21 Claims, 4 Drawing Sheets

(51) Int. Cl.
*C08J 11/02* (2006.01)
*C08J 11/28* (2006.01)

(52) U.S. Cl.
CPC .......... *B01J 31/0292* (2013.01); *C08J 11/02* (2013.01); *C08J 11/28* (2013.01); *B01J 2531/842* (2013.01); *C08J 2367/00* (2013.01); *C08J 2371/00* (2013.01); *C08J 2377/00* (2013.01); *C08J 2379/02* (2013.01); *Y02W 30/706* (2015.05)

(56) References Cited

OTHER PUBLICATIONS

Dalaigh, "A Magnetic-Nanoparticle Supported 4-N,N-Dialkylaminopyridine Catalyst: Excellent Reactivity Combined with Facile Catalyst Recovery and Recyclability", Angew. Chem., vol. 119, pp. 4407-4410, (2007).

\* cited by examiner

CATALYST COMPLEX AND METHOD OF DEGRADATION OF A POLYMER MATERIAL

CROSS REFERENCE TO RELATED APPLICATIONS

This is a U.S. National Stage of International Patent Application No. PCT/NL2016/050920 filed Dec. 23, 2016, which claims the benefit of and priority to International Application No. PCT/NL2015/050905 filed Dec. 23, 2015 and Netherlands Application No. 2017033, filed Jun. 23, 2016, all of which are incorporated by reference herein in their entireties.

FIELD OF THE INVENTION

The invention relates to a catalyst complex for catalysis of degradation of a polymer material, said complex comprising magnetic particles and a plurality of catalytic groups bonded to the magnetic particles, which catalytic groups comprise a bridging moiety and a catalyst entity, wherein the catalyst entity comprises a positively charged aromatic heterocycle moiety, and a negatively charged moiety for balancing the positively charged aromatic moiety.

The invention further relates to a method of degrading a polymer material chosen from the group of polyesters, polyamides, polyamines and polyethers in a degradation reaction catalysed by a catalyst complex in solid form, wherein a carrier liquid acts as a reactant in the degradation reaction, which catalyst complex comprises magnetic particles and bonded thereto a plurality of catalytic groups comprising a bridging moiety and a catalyst entity, wherein the catalyst entity comprises a positively charged aromatic heterocycle moiety, and a negatively charged moiety for balancing the positively charged aromatic moiety, which method comprises the steps of
- providing the catalyst complex and the polymer to be degraded;
- mixing the catalyst complex, the polymer to be degraded and the carrier liquid;
- carrying out the degradation reaction to obtain a mixture comprising monomer, oligomer, additive, catalyst complex and carrier liquid;
- adding a polar medium, particularly water or an aqueous solution, to the mixture, to obtain a hydrophilic solution comprising monomer and a second phase comprising oligomers and catalyst complex; and
- separating the first aqueous phase from the second phase.

BACKGROUND OF THE INVENTION

Such a catalyst complex and the degradation method are known from WO2014/209117A1. The known complex comprises a magnetic nanoparticle, so as to enable a separation between the first aqueous phase and the second phase under the impact of an external magnetic field. The second phase contains catalyst complex, additives, oligomers, trimers and dimers. This second phase may be reintroduced in a first reaction step, wherein the polymer is degraded. The monomers can be retrieved by means of crystallisation. According to the said patent, a rather small size of 5-10 nm is optimal in terms of yield and recovery of catalyst complex. This recovery is carried out by applying an electro-magnetic field gradient, such as by an external magnet. Herein, a separation is made between a first phase comprising the solvent, added water and monomer and a second phase comprising catalyst complex, oligomers, trimers and dimers.

In further experiments with the catalyst complex, it has been found that the separation between the two phases is not perfect. A significant amount of catalyst complex tends to end up in the first phase that comprises the solvent, for instance ethanediol, and added water. This catalyst complex has to be removed and cannot be reused again. This is disadvantageous for the overall yield and commercial viability of the degradation treatment.

SUMMARY OF THE INVENTION

It is therefore an object of the invention, to provide an improved catalyst complex and an improved degradation method that are suitable for the degradation of waste polymers, such as polyamides and polyesters, more particularly for polyethylene terephthalate and other condensation polymers in use as packaging materials, textile materials and the like.

This object is achieved in that the complex comprises a magnetic particulate body containing iron oxide at its surface, with an average diameter of 150-450 nm, wherein a plurality of catalytic groups grafted onto a surface of the magnetic particulate body, which catalytic groups comprise a bridging moiety and a catalyst entity, wherein the bridging moiety comprises a functional group for adhesion or bonding to the particulate body and a linking group towards the catalyst entity, and wherein the catalyst entity comprises a positively charged aromatic heterocycle moiety, and a negatively charged moiety for balancing the positively charged aromatic moiety.

The object is further achieved by means of the use of the improved complex according to the invention in the degradation of the polymer material comprising the steps of:
- providing the catalyst complex and the polymer to be degraded;
- mixing the catalyst complex, the polymer to be degraded and the carrier liquid;
- carrying out the degradation reaction to obtain a mixture comprising monomer, oligomer, catalyst complex and carrier liquid;
- adding a polar medium, particularly water or an aqueous solution, to the mixture, to obtain a hydrophilic solution comprising monomer and a second phase comprising oligomers and catalyst complex; and
- separating the first aqueous phase from the second phase, particularly by a centrifuge treatment.

The invention achieves not merely a good catalysis of the depolymerisation reaction but also adequate separation of the catalyst complex from the monomers, it has been found that the catalyst complex is to be provided with an (number) average particle size of 150-450 nanometers, preferably from 200-400 nanometers. It has been found in experiments leading to the invention that good depolymerisation results are achieved with functionalized magnetic particulate bodies with a size that is significantly higher than those of the nanoparticles. The adequate depolymerisation with such bigger particles is deemed surprising, as it is typically held that the larger surface area and therewith better catalysis is the key benefit of nanoparticles. Moreover, such functionalized magnetic particulate bodies can be easily separated in a centrifuge treatment.

In one preferred embodiment, the complex is provided in the form of an aggregate. This is a network or agglomerate of magnetic nanoparticles that is formed by Van der Waals bonding in particular. It was found that the size of the aggregate may be varied and tuned by means of its manufacturing. Particularly, such manufacturing involves a step of washing nanoparticles, after the initial preparation. Evidently, also the size of the initial nanoparticles has an impact on the size of the aggregate. Suitably, the size of the initial nanoparticles is between 2 and 20 nm, such as between 5 and 15 nm. The washing is more particularly carried out with a polar washing agent, such as an aqueous solution or water. It has turned out that the washing agent, the number of washing steps and the contact time between the washing agent and the nanoparticles have an impact on the aggregate formation. The aggregate turns out sufficiently stable, such that the subsequent grafting of the catalyst groups onto the nanoparticles, results in the bonding of these groups onto the surface of the aggregate. It appears that the aggregate with the grafted catalyst groups (hereinafter also referred to as linker-catalyst intermediate) may be recycled and remains stable during several degradation cycles.

The average size of the aggregate is for instance up to 500 nm. In one embodiment, the size is from 200-350 nm. The size of the aggregate may be controlled by the pH during the synthesis of the magnetic nanoparticle, the washing agents and the duration of the washing steps. Also sonication may be used, for instance during functionalisation, to limit the aggregate formation, and thus to define the size of the aggregate. Preferably, the aggregate is at least 100 nm in size, which is beneficial to obtain an excellent separation by means of a centrifuge Smaller aggregates and individual nanoparticles turn out to enter the hydrophilic solution, rather than the second phase including oligomers. This occurs more particularly, if a centrifuge treatment is used for the separation rather than by means of the application of an external magnetic field, as in the prior art. The magnetic nanoparticles are prepared, in one suitable embodiment, by coprecipitation along the Massart method. However, alternative preparation methods are not excluded, and these methods may lead to other particle sizes of the nanoparticles to be agglomerated, or to particles that are inherently porous.

In one embodiment, the particulate body has a specific surface area of 10-60 $m^2/g$, more preferably 10-40 $m^2/g$, as measured in accordance with a BET isotherm. Such a surface area reveals that the material is porous, since it is significantly larger than the surface area that can be calculated for a spherical particle of corresponding diameter. The material may be mesoporous, microporous or even contain relatively deep cavities. It is believed by the inventors, that the porosity aids in the diffusion of the polymer chains from the polymer to be degraded. Typically, for instance with PET and polyamides, the depolymerisation temperature is chosen at a temperature above the glass transition temperature and below the melting temperature. In this temperature range, the diffusion of individual chains is typically hampered, so as to mainly one-dimensional. By creating a porous structure, the polymeric chain may diffuse out of a solid fragment in a quasi one-dimensional direction, also known as reptation. The porous structure thus aids in allowing break up of the polymer by means of glycolysis at one or more locations along the polymer chain. Even though the diffusion behaviour of the individual polymer chains is not fully understood, it is believed that the porous structure is favourable because of its ability to accommodate the chains. This has been confirmed by experimental observations of the inventors that the aggregate depolymerises the polymer to a larger extent, quicker and at a lower temperature than catalysts based on bigger particles, for instance particles of around 5 microns size. The aggregate is herein particularly useful for the depolymerisation into oligomers. It was a surprising recognition that not the surface area is of key importance to the rate of depolymerisation, but rather the microstructure of the catalyst as such. It is added hereto, that the catalyst complex has been found to have synergy in catalysis, also because both the magnetic particle and the catalyst entity are believed to work as a catalyst.

Where the magnetic particulate body is porous, its surface comprises both a pore surface and an outer surface. The diameter of the body, and particularly the aggregate, is herein based on the outer surface. It is observed that such a porous structure is beneficial for the speed of degradation, since it combines a high surface area with acceptable size for centrifugal separation. Furthermore, it is believed by the inventors, that the porosity may be very beneficial for the degradation of the polymer into oligomers.

In addition to an aggregate, a catalyst complex composition used for depolymerisation of the invention may further comprise both an aggregate and another particulate body, such as particles with a size in the micron range, more preferably porous particles. Suitably, these other particulate bodies have a specific surface area in the range of 10-50 $m^2/g$, even though this may not be strictly necessary. In such a mixture, the aggregate is deemed to operate particularly for the depolymerisation of the polymer and to ensure that all polymer is depolymerised, whereas the other material may contribute to further glycolysic decomposition from oligomers into monomers and dimers.

The separation step preferably involves a centrifuge treatment. This is advantageous for industrialisation. Moreover, it turns out that the centrifuge treatment is effective for the degradation of waste polymers including colorants such as pigments and dyes. It was found herein that particulate pigments and a variety of dyes end up in the second phase, whereas some more polar dyes may end up in the hydrophilic solution. Surprisingly, these additives can thereafter be removed on an absorbent, such as active coal. Suitably, any remaining nanoparticles are removed from the hydrophilic solution by means of membrane filtration. This reduces the risk that the final monomeric product would contain contaminants.

In an example of the present catalyst complex the magnetic particles (or the particulate body) are at least one of ferromagnetic particles, anti-ferromagnetic particles, ferrimagnetic particles, synthetic magnetic particles, paramagnetic particles, superparamagnetic particles, such as particles comprising at least one of Fe, Co, Ni, Gd, Dy, Mn, Nd, Sm, and preferably at least one of O, B, C, N, such as iron oxide, such as ferrite, such as magnetite, hematite, and maghemite. In view of costs, even when fully or largely recovering the present catalyst complex, relatively cheap particles are preferred, such as particles comprising Fe. Preferably, the nanoparticles are selected so as to be substantially insoluble in the (alcoholic) solvents, also at higher temperatures of more than 100° C. One oxide that readily tends to dissolve at higher temperatures in an alcohol such as glycol, is for instance, such as amorphous $SiO2$, are not suited. Particularly, it has been found that the present catalyst complex does not need calcination. It is thermally stable and is was found that neither the size (diameter) nor the shape of the aggregate changes considerably due to recycling and reuse. This is a very big advantage.

Preferably, the magnetic nanoparticles contain iron oxide. Not only the catalytic entity catalyses the degradation, but also the iron oxide nanoparticle has a positive impact thereon. The iron nanoparticle is more particularly a ferrite, and more particularly magnetite, hematite and maghemite. The iron oxide may further contain additional elements such as cobalt and/or manganese, for instance $CoFe2O4$.

The functional groups of the bridging moiety are for instance weak organic acid, such as a carboxylic acid or a dicarboxylic acid, but preferably silanols, including silanediols and silanetriols. The bridging moiety may be introduced as a reactant in the form of a silyl comprising group, such as silyethers, such as triethoxysilylpropylhalide. The linking group is for instance an alkylene chain, with the alkylene typically between C2 and C10, preferably C3-C5, i.e. propylene, butylene, pentylene. Propylene is preferred. The bridging moiety is suitably provided as a reactant, in which the linking group is functionalized for chemical reaction with the catalyst entity, whereas the functional group may be protected. For instance, a suitable functionalisation of the linking group is the provision as a substituted alkyl halide. A suitable protection of the functional group may be in the form of an ester or alkoxysilane. The alkoxygroup is preferably ethoxy, though methoxy or propoxy are not excluded.

In one further embodiment, the alkoxysilane is provided as a trialkoxysilane, having one alkylene group that constitutes the linking group. In an alternative embodiment, use is made of dialkyldialkoxysilanes, with one of the alkyl groups being the linking group. In again another embodiment, use is made of monoalkoxy-trialkylsilanes, with one of the alkyl groups being the linking group. In the latter cases, the alkyl groups are preferably lower alkyl, such as C1-C4 alkyl, thus methyl, ethyl, propyl, n-butyl, isobutyl. At least one of the alkyls is then functionalized, for instance with a halide, as specified above. Linear alkyls appear preferable to limit steric hindrance.

The use of a dialkyl-dialkoxysilane and/or a monoalkoxy-trialkylsilane is understood to be beneficial to create a better separation between the hydrophilic solution & second phase, and to ensure that the complex enters the second phase, rather than the hydrophilic solution, where it will be lost. It is believed that not all alkoxy-groups of the trialkoxysilanes bond to the surface of the nanoparticle aggregate. Some of the alkoxygroups may even remain protected. The protective groups may however be removed upon addition of water to the complex. As a result, the hydrophilicity of the complex may increase. By using silanes with less alkoxy-groups, the remaining groups are inherently non-polar and cannot become unprotected. The entire complex thus becomes more hydrophobic. Rather than merely one type of bridging moiety, also known as a silane coupling agent, a mixture of those may be used, for instance a mixture of alkyltrialkoxysilane and dialkyl-dialkoxysilane, wherein one of the alkyl-groups is functionalized as a halide to react to the catalytic entity, and subsequently—after the reaction of both—carries the catalytic entity. The addition of dialkyldialkoxysilanes may well reduce the size of the layer of groups bonded to the surface. This is not deemed a disadvantage.

The aromatic heterocyclic moiety suitably comprises a heterocycle having at least one, preferably at least two nitrogen atoms. The heterocycle may have 5 or 6 atoms, preferably 5 atoms. Suitable aromatic heterocycles are pyrimidines, imidazoles, piperidines, pyrrolidine, pyridine, pyrazol, oxazol, triazol, thiazol, methimazol, benzotriazol, isoquinol and viologen-type compounds (having f.i. two coupled pyridine-ring structures). Particularly preferred is an imidazole structure, which results in an imidazolium ion. The negatively charged moiety may relate to a salt complex, but alternatively a negatively charged ion, such as a halide. Preferably, the reaction of the alkylhalide of the bridging moiety with an uncharged aromatic heterocyclic moiety including at least one nitrogen atom generates the positive charge on the aromatic moiety, particularly on the nitrogen atom therein, as well as the creation of the negative halide. The negatively charged halide may thereafter be strengthened by addition of a Lewis acid to form a metal salt complex. One example is the conversion of chloride to $FeCl_4^-$. The aromatic moiety has in one example at least one tail. The at least one tail preferably has a length of $C_1$-$C_{10}$, such as $C_2$-$C_4$, the at least one tail suitably being attached to a nitrogen atom. This tail is more particularly a tail extending into the carrier liquid and away from the bridging moiety. A longer tail is deemed beneficial to increase the hydrophobicity of the complex. This may counteract tendencies of complex to enter the hydrophilic phase.

In an example of the present catalyst complex, the bridging moiety (and the catalyst entity bonded thereto) is provided in an amount of $5.10^{-10}$-$0.1$ (mole bridging moiety/gr magnetic particle), preferably $10^{-7}$-$0.01$, more preferably $2.10^{-5}$-$10^{-3}$, such as $4.10^{-5}$-$10^{-4}$, or such as $2.10^{-4}$-$10^{-3}$. It has been found that limited coverage of the surface of the aggregate with the catalyst group is sufficient to obtain an effective catalyst. It is assumed that if a predetermined amount (moles) of bridging moiety is attached to a predetermined amount (gr) practically all of the bridging moieties attach to the nanoparticle and substantially stay attached during the present method.

In case of degradation, the solid polymer is provided in a carrier liquid that is a suitable solvent for the monomer. As such, the method is considered as a solid-liquid degradation process supported by addition of a recoverable catalyst complex. For instance, alcohols may be used. Preferred alcohols are aliphatic, for instance alkanols and alkanediols. For glycolysis, the solvent is preferably an alkanediol or alkanetriol, such as glycol, glycerol, propylene glycol. Suitably, the polymer to be degraded is a condensation polymer, for instance chosen from polyesters, polyethers, polycarbonates, polyimides and polyamides. Representative examples include PET (polyethylene terephthalate), PEF (polyethylene furanoate), PTT (polytrimethylene terephthalate), PLA (polylactic acid).

More generically, the polymer may be selected from natural polymers, biobased polymers, biodegradable polymers, polymers formed (directly or indirectly) from fossil fuels, and combinations thereof. In an example the polymer is at least one of a polyester, a polyether, such as polyoxymethylene (POM), polyethylene glycol (PEG), polypropylene glycol (PPG), polytetramethyleneglycol (PTMG), polyethylene oxide (PEO), polypropylene oxide (PPO), polytetrahydrofuran (PTHF), and polytetramethyleneetherglycol (PTMEG), a polypeptide, a polyamide, a polyamine, a polycondensate, preferably a polyester, such as poly carboxylic ester, wherein the poly carboxylic ester is preferably selected from polyethylene terephthalate (PET), polyethylene furanoate (PEF), polybutylene terephthalate (PBT), polytrimethylene terephthalate (PTT), polyglycolic acid (PGA), polylactic acid (PLA), polycaprolactone (PCL), polyethylene adipate (PEA), polyhydroxyalkanoate (PHA), polyhydroxybutyrate (PHB), polyethylene naphthalate (PEN), Poly(3-hydroxybutyrate-co-3-hydroxyvalerate) (PHBV), and a polycondensate of 4-hydroxybenzoic acid and 6-hydroxynaphthalene-2-carboxylic acid (VECTRAN). In other words, a large variety of polymers may be degraded by the present method. Some adjustments may be necessary, e.g. in terms of catalyst used, temperature applied, solvent used, etc. The present method is best suited for degradation using glycolysis, such as in degradation of polyesters and polyethers, in particular PET and PEF. Suitably, the polymer material to be degraded is a waste polymer material, for instance from bottles or textiles. This waste material typically comprises one or more additives. Particularly the colorants therein are deemed problematic.

The additive is suitably a colorant, such as a pigment or dye. A variation of dyes and pigments used in polymer materials of the representative examples mentioned above, for instance PET, may well be known to those in the art of the manufacture of articles of those polymers, such as bottles. It is found in the current process that these can be removed. Particularly, when using a centrifuge for the separation of the hydrophilic solution and the second phase, the additives may either enter the second phase (first additive) or the hydrophilic solution (second additive). It may well be that some more hydrophilic non-particulate additives, enter the hydrophilic solution. Organic and hydrophobic dyes, as well as particles, may well enter the second phase.

In accordance with a preferred embodiment of the method of the invention, first additives may be removed from the catalyst complex by treatment with a washing agent, such as a hydrophobic solution, for instance dichloromethane. It has been found in preliminary investigations that degradation treatments of several (5-20) batches of colored polyester bottles may be carried out before a washing step is needed. As such the method is considered robust, to be used under relatively sub-optimal conditions, such as in a plant. The catalyst complex may further be separated from any inorganic oxide by means of an external magnetic field.

In accordance with another embodiment, the second additive is removed from the hydrophilic solution by adsorption, preferably in exchange with an adsorption medium, such as active carbon. In this manner, it has been found that monomers can be obtained that are free of colored additive and are thus useful as raw material. More suitably, the hydrophilic solution is further treated to remove any solid material in a membrane filtration treatment, such as for instance nanofiltration or ultrafiltration. More preferably, the monomer is obtained in a crystallisation step, downstream of the exchange with the adsorption medium. Any solvent remaining, typically a mixture of ethylene glycol and water, is then recovered and recycled after reducing the water content, which reduction goes up to substantially zero water content.

After degradation the obtained mixture may be cooled down, e.g. to 50-85° C. At this temperature a separation is performed, most particularly by centrifugation. Thereafter a mixture may be cooled down even further, e.g. to 1-10° C., in order to precipitate e.g. a monomer or dimer. The obtained precipitate may further be dried, e.g. at 50-75° C.

The present catalyst complex may for instance be used in a ratio (weight to weight) of Complex:PET in a range of 1:5 to 1:500, such as 1:30-1:300, more preferably to 1:50 to 1:200. It is an advantage of the use of the catalyst complex of the invention with an effective size of at least 0.15 microns and a sufficient specific surface area, particularly of at least 10 $m^2/g$, as it has been found that a low amount of catalysis is sufficient. In addition the amount of e.g. ethylene glycol:PET may vary from 1:2 to 1:20, such as 1:3 to 1:10. The waste polymers may relate to a single type of polymer, such as PET, PEF, PA, etc., and also to a mixture thereof. It typically comprises 50-99.9 wt. % of a specific polymer, such as PET, the remainder being impurities, other polymers, other compounds, etc.

BRIEF INTRODUCTION TO THE FIGURES

These and other aspects of the invention will be further elucidated with reference to the figures, wherein.

DETAILED DESCRIPTION OF ILLUSTRATED EMBODIMENTS

Figure 1A:
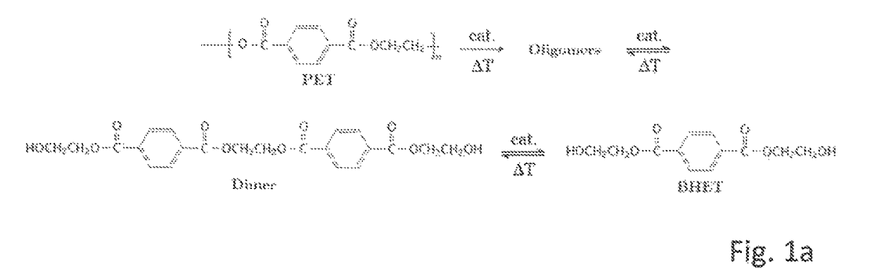
FIG. 1a-e shows chemical reactions and catalyst complexes.

FIG. 1a shows chemical reactions. Therein poly(ethylene terephthalate) is degraded (by using magnetite nanoparticles to which are bonded catalysts comprising a triethoxysilylpropyl as starting compound for the bridging compound and as ionic liquid butylimidazolium iron tetrachloride ((bim) FeCl4) in 1,2-ethanediol. As a result Terephthalic Acid Bis(2-Hydroxyethyl) ester (BHET) is formed. Further, it is shown that BHET can be converted into dimers and oligomers (typically having 3-12 monomers).

Figure 1B:
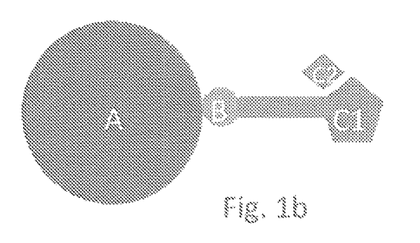

FIG. 1b shows a schematic representation of the present catalyst complex. Therein A represents a nanoparticle, such as maghemite, B a bridging moiety directly attached to the nanoparticle, such as triethoxysilylanolpropyl, and C a catalyst entity, directly attached to the bridging moiety, with C1 being a positive catalyst moiety, such as bim, and C2 being a negative catalyst moiety, such as $Cl^-$. If present (hence not shown) a tail would extent away from the nanoparticle.

Figure 1C:
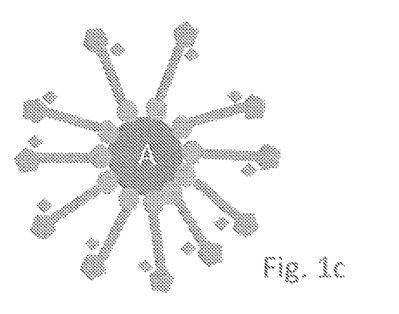

FIG. 1c shows a nanoparticle A surrounded by a number of bridging moieties and catalyst entities attached to the nanoparticle.

Figure 1D:
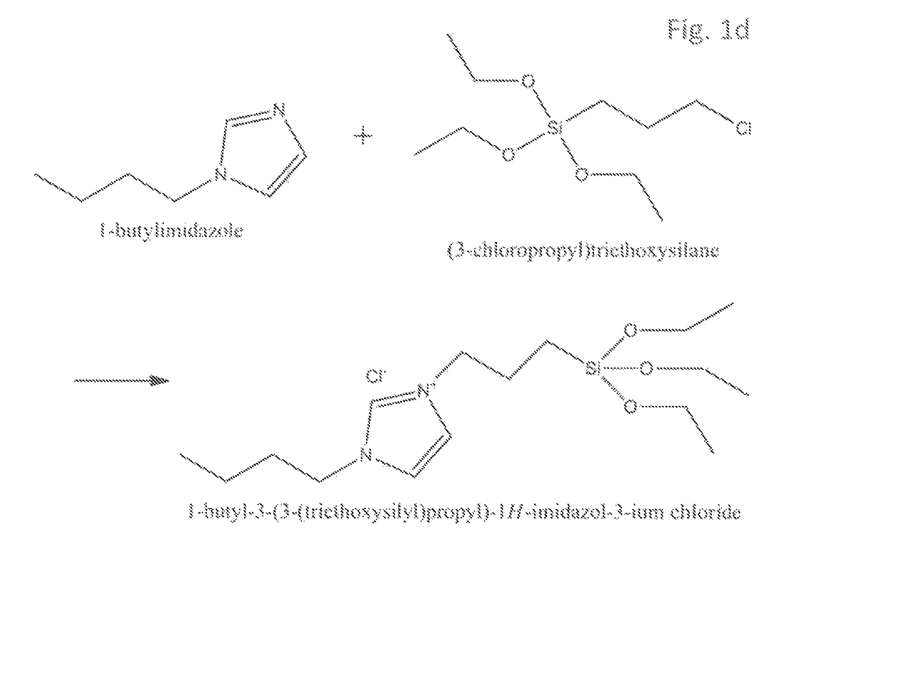
Figure 1E:
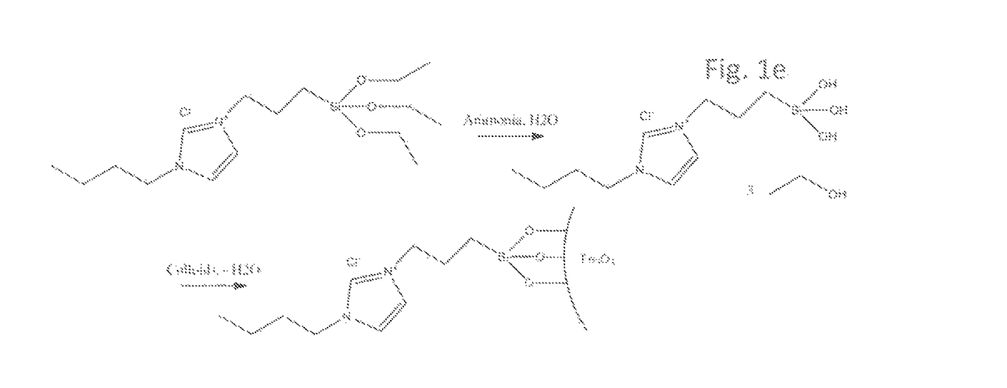

FIGS. 1d and 1e show reaction equations for formation of the catalyst complex of the invention in accordance with one preferred embodiment. In a first step, shown in FIG. 1d, an intermediate is formed by reacting of 1-(triethoxysilyl)propyl-3-chloride with butylimidazol. The resulting linker-catalyst intermediate is the combination of positively charged N-[3-(triethoxysilyl)propyl]-butylimidazolium and negatively charged chloride. Subsequently, a Lewis acid, such as FeCl3 may be added. However, that is not deemed necessary. In a second step, shown in FIG. 1e, the ethoxy-groups of the said reaction product thereof are converted to hydroxyl-groups to result in a silanol-group. In a third step, that is for instance carried out in water or in ethanol or aqueous ethanol, the silanol is reacted with the nanoparticle surface, in the presence of a base. The resulting catalyst complex may thereafter be (re)dispersed in the desired solvent for the polymer degradation, for instance glycol.

In one preferred embodiment, a washing step is performed in order to remove the captured compound. Advantageously, this washing needs only to be done after a series of runs or cycles. If an amount of additive is large relative to the amount of catalyst complex the catalyst complex may be washed; typically the capacity for capturing additives by the complex, as indicated above is relatively large and the complex only needs to be washed after 5-10 cycles.

Suitably, use is made of an aggregate of magnetic particles to which a linker-catalyst intermediate is grafted. The linker-catalyst intermediate is prepared from the reaction of a linker group, typically an alkylalkoxysilane and an aromatic heterocycle, particularly containing at least one nitrogen atom, more particularly pyrimidine or imidazole. In order to achieve the reaction, at least one of the alkyl-groups of the linker group suitably comprises a halogen substituent.

EXAMPLES

Tests have been performed on coloured PET and previously for non-coloured PET. The results thereof are in the same order of magnitude for both conversion and selectivity towards BHET. As a consequence inventors conclude that a colour additive has hardly any or no impact in this respect. Even further, additives, such as pigments, can be removed from the degradation products, with ease.

Similar tests as above have been performed on a wide range of raw (PET) material, e.g. polyester clothing, PET carpet, PET material from automotive industry, recycled PET, multi-layered PET trays containing other polymers, such as PE and PP. The results thereof are in the same order of magnitude. As a consequence inventors conclude that the process is highly insensitive to different raw (PET) material and robust as well.

In an example inventors used 1 g of catalyst complex of FIG. 1e and 5 g of PET. Experiments showed that all colorants were removed by the complex, that is no colour was detectable in the obtained BHET/ethylene glycol (EG)/water phase. It has been found that the present complex is capable of removing at least 2.5 mg colorant/g complex in one single use; examples show a removal of 25 mg colorant/g complex in a single run. When used in sequence of e.g. five times it has been found that the complex removes at least 12.5 mg colorant/g complex. When used for a large number of sequences (e.g. up to 50 times) there is been found no drawback in efficiency; hence the complex is considered to be capable of removing at least 125 mg/g complex. Such a capability is considered enough for most applications considered.

Example 2: Preparation of a Catalyst Catalyst Complex

Preparation of the linker-catalyst complex (bridge-catalyst). An alkylimidazole is mixed with a halogensilane in a 1:1 molar ratio and stirred at a slightly elevated temperature for 8 hours. The nanoparticles are prepared based on the method first described by Massart et al. in 1981: An Fe(II) solution is mixed with a Fe(III) solution in a 1:2 molar ratio respectively. The iron oxide nanoparticles are formed by a co-precipitation reaction in basic medium while stirring. Subsequently, the resulting iron oxide particles are washed with water repeatedly, for instance 2-4 times, and ethanol. In order to separate the iron oxide particles from the washing agent, use is made of magnetic separation.

Next, an adequate amount of linker-catalyst intermediate diluted with ethanol is mixed well with the dispersion of iron oxide particles, after which ammonia added. The reaction mixture is stirred for 15 hours. Depending on a ratio between linker-catalyst and nanoparticle an amount of linker-catalyst per nanoparticle may vary. The particles are washed with acetone prior to redispersion in ethylene glycol. The amount of linker-catalyst compound may be chosen. Suitably, a relatively low amount of 0.1-10% of linker-catalyst relative to the total weight of the catalyst complex is used. In one embodiment, the amount is in the order of 3-6%, in another embodiment, the amount is less than 1%. As a result, the surface of the nanoparticles will not be covered by several layers of linker-catalyst. Rather, a situation occurs wherein part of the surface is not covered. This is deemed suitable, so as to limit steric hindrance of the catalyst entities, particularly imidazolium ions. As a result, aggregates of magnetic nanoparticles, typically in the range of 2-100 nm, for instance 5-20 nm, are formed, wherein the linker-catalyst intermediate compound is grafted onto the surface of the magnetic iron oxide particles. A plurality of non-aggregated nanoparticles is present as well. A size separation step is carried out to remove the non-aggregated nanoparticles. Use can be made therein, for instance of centrifugation, filtration or membrane filtration.

Example 3: Diameter Characterisation of the Formed Aggregate Catalyst Complex

The outside diameter of the aggregates as obtained in Example 2 was determined by means of dynamic light scattering, using a Malvern apparatus (n5000 series). According to this method, a single measurement is based on 7 samples, each of which samples is measured for a plurality of times. All samples were qualified in advance and found suitable for use as a catalyst in the degradation of PET. In a bimodal or multimodal distribution, individual peaks may be identified. As such, it is feasible to distinguish aggregates from non-aggregated particles. The average diameter was determined on the basis of the average number (highest number) and highest intensity, in accordance with the software of the apparatus. Table 1 shows the results. The average highest number varies between 186 and 332, with the average around 250-260 nm; the average intensity varies from 254 to 402, with the average around 320 nm. The average based on intensity is more sensitive to the presence of minor amounts of large particles (as the weight-average molecular weight); therefore the number-average is more appropriate. This confirms that the aggregates with the linker-catalysts grafted thereon being stable. Use confirmed that the aggregates can be reused several times without destabilisation.

TABLE 1 particle size distribution

| No | Average diameter in nm (highest number) | Average diameter in nm (highest intensity) |
|---|---|---|
| 1 | 262 ± 22 | 315 ± 28 |
| 2 | 271 ± 9 | 323 ± 11 |
| 3 | 203 ± 10 | 266 ± 12 |
| 4 | 250 ± 7 | 324 ± 22 |
| 5 | 186 ± 22 | 254 ± 22 |
| 6 | 297 ± 46 | 374 ± 17 |
| 7 | 332 ± 20 | 402 ± 31 |
| 8 | 203 ± 23 | 306 ± 31 |
| 9 | 284 ± 12 | 350 ± 18 |
| 10 | 253 ± 14 | 335 ± 17 |

Example 4: Surface Area Characterisation

Adsorption area of samples prepared in accordance with the method of Example 2 as well as other samples was characterized by means of the BET isotherm, as known in the art, using $N_2$ for adsorption. One feasible type of equipment is for instance Nova Quantachrome 4200e. In comparative samples 3-6, sonication was applied during functionalisation of the magnetic nanoparticles with the linker-catalyst intermediate, and optionally during the preparation of the magnetic nanoparticles. Such sonication is known to inhibit the formation of aggregates. Also protective compounds were added in samples 5 and 6. Comparative examples 7-9 were calculated to identify the surface area of non-porous spheres of a predefined diameter. Table 2 shows the results.

TABLE 2 surface area of nanoparticles, aggregates and non-porous spheres

| No | Type of particle | Sonication and protection treatment | Aggregate | Surface area (BET) m$^2$/g |
|---|---|---|---|---|
| 1 | Functionalized nanoparticle | None | Yes | 19 |
| 2 | Functionalized nanoparticle | None | Yes | 26 |
| 3 | Functionalized nanoparticle | Sonication during functionalisation | No | 63 |
| 4 | Functionalized nanoparticle | Sonication during synthesis/washing of nanoparticle and during functionalisation | No | 101 |
| 5 | Functionalized nanoparticle | As in sample 4, with extra addition of polymer stabilizer | No | 90 |
| 6 | Functionalized nanoparticle | As in sample 4, with extra additions of ionic stabilizer | No | 94 |
| 7 | Non-porous sphere of 10 nm | — | No | 115 |
| 8 | Non-porous sphere of 100 nm | — | No | 12 |
| 9 | Non-porous sphere of 200 nm | — | No | 6 |

The measurements indicate that the aggregates as prepared according to one example of the invention have a specific surface area in the range of 15-30 m2/g. As there is a plurality of variables to control the aggregate formation, this surface area may further be optimized, for instance in the range of 10-50 m$^2$/g. It turns out that the specific surface area increases (dramatically) when sonication is applied during the synthesis and functionalization. Extra stabilization during the synthesis, either by a polymer or by ions, does not increase the specific surface area. Upon comparison with reference examples 7-9, it appears that the surface areas obtained for the samples 3-6 using sonication comes close to the surface area for single 10 nm spheres. This strongly suggests the presence of single nanoparticles. It further turns out that the surface area of the aggregates is much lower than for single 10 nm nanoparticles, but still much higher than for 200 nm diameter spheres, which is even below the average size of the aggregates. It can be concluded the aggregates are porous and not smooth.

Example 5: Depolymerisation Method

The reference scale of a laboratory experiment is 50 g of ethylene glycol (EG) in a 100 mL flask. The reference mass ratio of the reaction is 1 g of dry catalyst complex: 5 g of PET: 50 g of EG. The reference catalyst complex comprises 5 nm magnetite nanoparticles and trisilanolpropyl as bridging moiety and as ionic liquid (bim)FeCl4 or (bim)Cl. A reference reaction was executed as follows:

The catalyst complex dispersion was homogenised by shaking for 5 minutes by hand. To 10 g of catalyst complex dispersion 41 g of EG was added and the liquids were shortly mixed by hand to homogenise the dispersion. Then, 5 g of PET flakes were added and the round bottom flask was placed in the heating set up. The PET flakes were prepared from colored PET bottles such as commercially available blue colored bottles and red colored bottles. The heating was started and within 20 minutes, the reaction mixture had reached the reaction temperature of 150-200° C. The reaction was followed in time by taking in-process-control samples to measure the concentration of BHET produced as a function of time. The concentration of BHET was determined with HPLC. The results are listed in Table 3. It was found that the reaction conditions (temperature, concentration of catalyst complex, type and size of nanoparticle) could be varied in sufficient broad ranges.

TABLE 3

Conversion of PET to BHET as a function of time for a standard reference PET depolymerisation reaction

| Time[min] | PET to BHET conversion [%] |
|---|---|
| 5 | 1.7 |
| 10 | 5.4 |
| 15 | 10.0 |
| 20 | 10.5 |
| 35 | 31.8 |
| 45 | 51.5 |
| 60 | 92.4 |

Example 6

After the depolymerisation reaction, water was added in a 1:1 ratio and the catalyst complex was separated from the liquid stream containing the monomer by magnetic separation. The liquid phase was decanted, leaving the capture complex as a slurry-like layer on the bottom of the beaker. The catalyst complex could be easily redispersed with ethylene glycol.

To release the colorants from the catalyst complex, an organic solvent, in this example CH2C12 was added and stirred vigorously. The catalyst complex was magnetically sedimented, leaving a clear red or blue supernatant, dependent on the type of bottle used for the flakes. The supernatant could be decanted and the catalyst complex could be redispersed in ethylene glycol again.

Example 7

Examples 5 and 6 were repeated using a white PET bottles that contained white-colored pigment, apparently TiO2. However, when the magnetic sedimentation was performed in the presence of the organic solvent to release the pigment, the liquid phase was left with the sedimented catalyst complex. This was left to stand overnight and a white layer of pigment particles had sedimented overnight on top of the catalyst complex sediment.

Example 8

The depolymerisation was repeated in a 1000 liter vessel. The degradation reaction was carried out at a temperature in the range of 180-210° C. The concentration of the catalyst complex was about 0.5 wt %, which was not very critical. After a predefined duration of the reaction, for instance 60-180 minutes, the reaction mixture was cooled down. Water was added and the mixture was led to a centrifuge for separation. This treatment resulted in a first hydrophilic solution and a second phase. The hydrophilic solution contained a mixture of water and the solvent, ethylene glycol. The second phase was in the form of a slurry, which contained a significant portion of solid material. At least 95% of the flow entering the centrifuge became hydrophilic solution. Typically, this was over 98%, or even over 99%. The hydrophilic solution was led via a membrane filter to remove solid material to an adsorbant, i.e. active coal.

Thereafter, the temperature of the hydrophilic solution was further cooled to below room temperature to effect crystallisation of the monomer. It is observed that the ratio between first and second phase could be varied by means of the duration of the reaction, and the extent of depolymerisation. The catalyst complex could be easily redispersed with ethylene glycol. The hydrophilic solution was fed into a membrane filter to remove any remaining nanoparticles. If the aggregates had been pre-treated to remove non-aggregated nanoparticles, the filter remained largely empty. If the aggregates had not been pretreated, the membrane filter contained significant amount of nanoparticles. Upon recycling and reuse of the aggregated nanoparticles, no increase in the filling of the membrane filter downsteam of the centrifuge was observed.

The reaction was followed using UV/Vis spectroscopy. Colorants were extracted from different fractions during and after depolymerisation using as suitable solvents acetone and acetonitrile. For the same of the second phase, acetone was used as the solvent, as it had already been used for extraction of the second phase. For the other samples, use was made of acetonitrile. It is observed that the present experiment focussed on molecular colorants. Inorganic pigments, though hydrophilic, turn out to be separated into the second phase, because of their particulate nature and/or interaction with the magnetic particles.

Figure 2A:
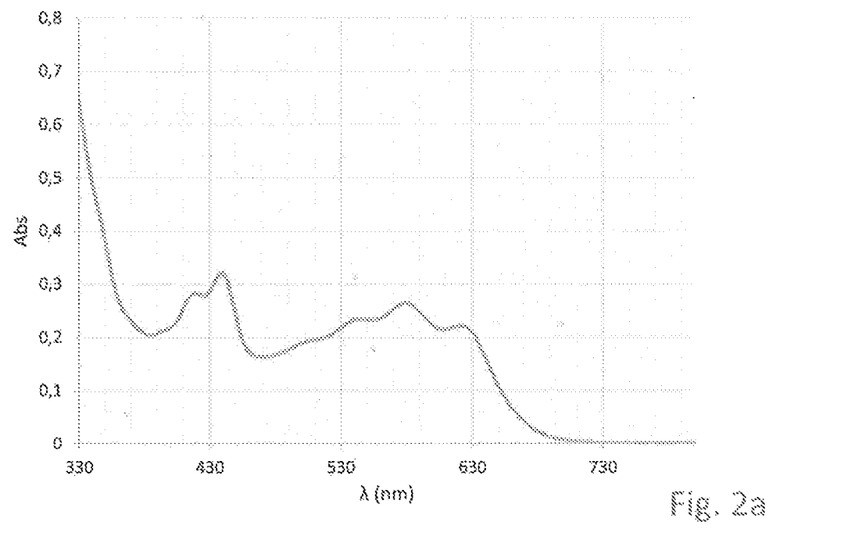
FIG. 2a-b shows UV-Vis spectra of polymer material before degradation and the remaining colorants after degradation.

FIG. 2a shows the spectrum of the polymer material to be degraded. Several distinct peaks are present in the visible range, primarily in the blue absorption range (419 and 440 nm), and yellow absorption (580 and 621 nm) wavelength range. The absorption in the background is significant (about 0.2). This is due to the presence of solid material. A large peak is visible at 330 nm. This is due to strong absorption of the monomer (BHET) and any oligomers in the UV range.

Figure 2B:
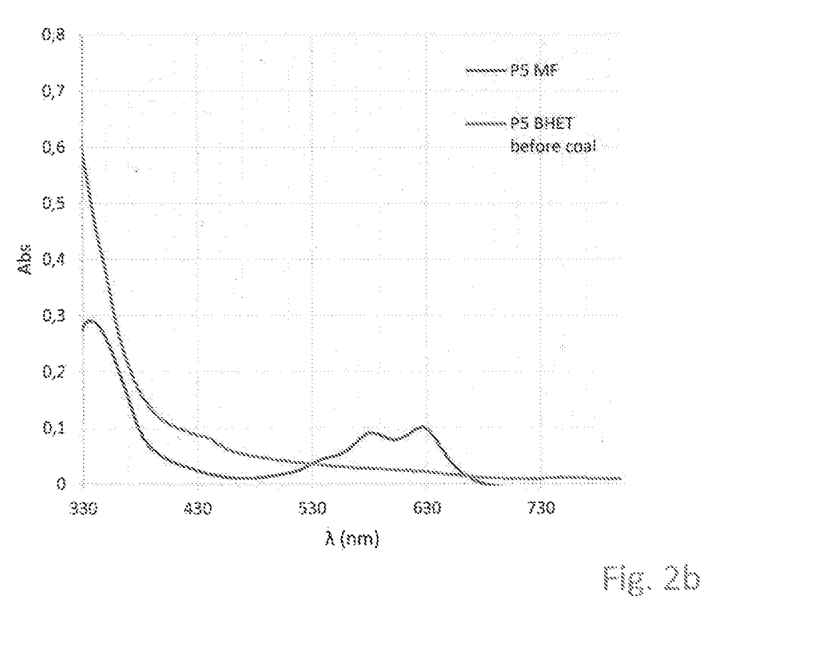

FIG. 2b shows the spectrum for both the hydrophilic solution and the second phase (after extraction). The second phase including the catalyst complex shows primarily absorbance in the yellow absorption range. The spectrum for the hydrophilic solution does not contain any signal in this range. This confirms the second phase containing the catalyst complex and some oligomer includes the blue color from the polymer material. It is believed that the blue color adsorbs to the catalyst particles or is dissolved in the oligomer. The spectrum of the hydrophilic solution however contained some absorption in the blue absorption range, and clearly more than the spectrum of the second phase. The peak appears to correspond with those in the initial polymer material. The signal is less pronounced, probably because the hydrophilic solution including the water dilutes the color and therewith the signal.

Figure 3A:
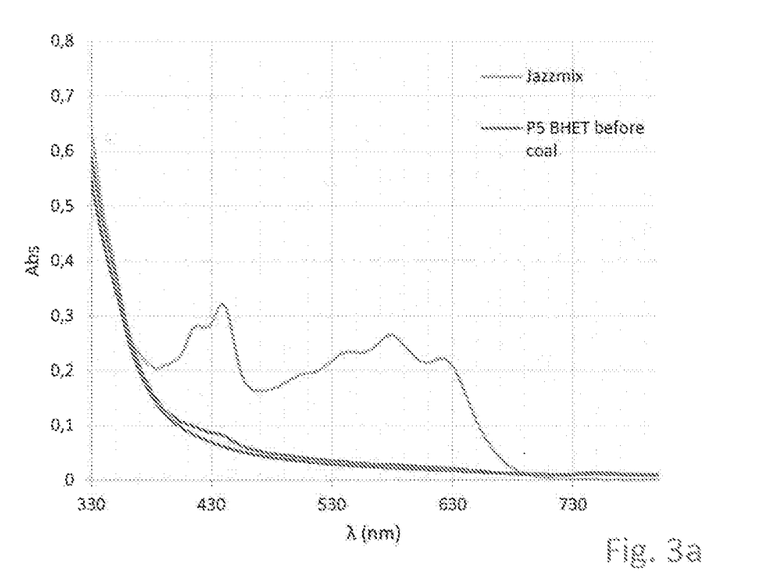
FIG. 3a-b shows further UV-Vis spectra.

FIG. 3a shows a further UV/Vis spectrum, containing the spectra of the hydrophilic solution before and after the active coal treatment. It is apparent that the peak in the blue absorption range is removed.

Figure 3B:
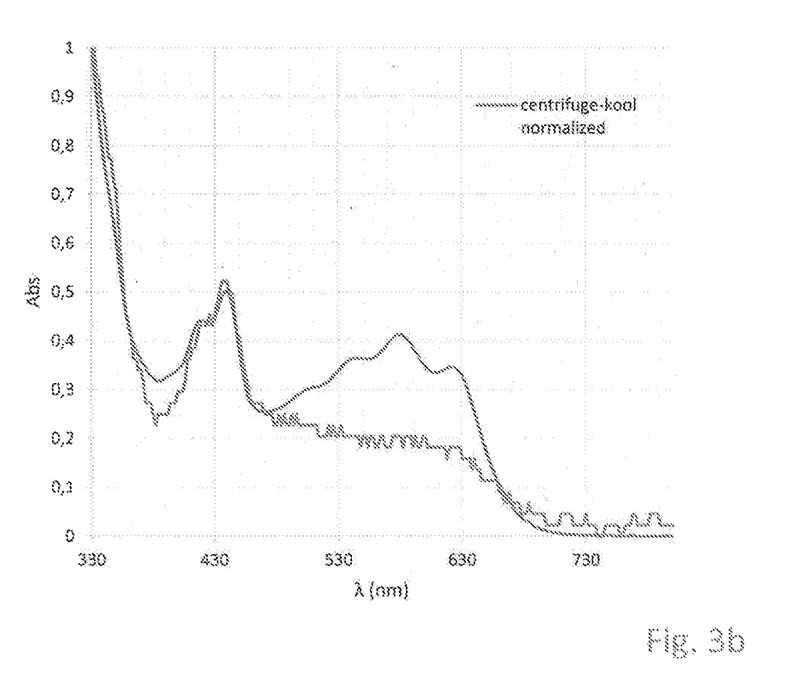

FIG. 3b shows again a further spectrum, wherein the difference between the two spectra in FIG. 3a is compared with the signal of the polymer to be degraded (FIG. 2a). All spectra are normalized, i.e. such that the spectra have the same intensity and allow a one-to-one comparison. The normalisation was carried out for the big peak at 330 nm wavelength. It is clear therefrom, that the difference between the spectra in FIG. 3a of the hydrophilic solution shows the same absorption peak as present in the polymer. This material is thus fully absorbed on the active coal.

In short, therefore, the present invention provides an improved process for degradation of Polyethylene terephthate (PET) and other condensation polymers such as polyamides, other polyesters and the like into monomers. Particularly, it has turned out feasible to end up at a clean monomeric product, devoid of colorants, also at an industrial scale. This is achieved in the invention in a multistep process, wherein first a separation is carried out by a centrifuge separation, making a difference between a second phase that is primarily particulate in nature and a first phase that is primarily liquid in nature. The first phase may still contain some nanoparticles, that can be removed afterwards, for instance in a membrane filter. The first phase is furthermore treated by an absorbent material, such as active coal, to remove any remaining molecular compounds. The improved process is especially achieved by means of a catalyst complex with an average particle size in the range of 150-450 nm, more preferably 200-400 nm, such as 200-350 nm. This is particularly an average, and it is not included that minor fractions of other sizes are available, to the extent that they may be separated from a liquid in a centrifuge treatment. It was found that the size and possibly the microstructure is more important for the catalysis than the maximum surface area. In one embodiment, the surface area can be as little as 1-5 $m^2/g$. Still a sufficient depolymerisation rate was observed. In one major embodiment, the magnetic particulate body has a specific surface area of 10-50 $m^2/g$. This body may for instance be present as an aggregate of magnetic nanoparticles.

The invention claimed is:

1. A catalyst complex for catalysis of degradation of a condensation polymer material, said complex comprising:
  a magnetic particulate body containing iron oxide at its surface;
  a plurality of catalytic groups grafted onto the iron oxide surface of the magnetic particulate body, which catalytic groups comprise a bridging moiety and a catalyst entity, wherein the bridging moiety comprises a functional group for adhesion or bonding to the iron oxide surface and a linking group towards the catalyst entity, and wherein the catalyst entity comprises a positively charged aromatic heterocycle moiety, and a negatively charged moiety for balancing the positively charged aromatic moiety, wherein the bridging moiety comprises a silanol group as a functional group for adhesion and an alkyl group as a linking group between the silanol group and the heterocyclic aromatic moiety, wherein the magnetic particulate body is an aggregate comprising magnetic nanoparticles with an number-average diameter of 200-350 nm, wherein the particulate body has a specific surface area of 15-30 $m^2/q$.

2. The catalyst complex of claim 1, wherein the particulate body is a porous body, wherein the surface comprises an outer surface and pore surface.

3. The catalyst complex of claim 1, wherein the magnetic nanoparticles have a size of 2-20 nm.

4. The catalyst complex of claim 1, wherein the positively charged aromatic heterocyclic moiety is an imidazolium-group.

5. The catalyst complex of claim 1, wherein the bridging moiety is derived from a monoalkoxy-trialkylsilane or a dialkoxy-dialkylsilane or a mixture comprising a monoalkoxy-trialkylsilane, a dialkoxy-dialkylsilane and/or a alkyl-trialkoxysilane, wherein at least one of the alkyl-groups is functionalized to form a linking group and wherein the alkyl groups are suitably lower alkyl groups, such as C 1-C4 alkyl.

6. A composition comprising the catalyst complex as claimed in claim 1 in a carrier liquid.

7. The composition as claimed in claim 6, wherein the carrier liquid is an alcohol.

8. The composition as claimed in claim 7, wherein the alcoholic carrier liquid is an alkanediol or an alkanetriol.

9. A method of degrading a condensation polymer material chosen from the group of polyesters, polyamides, polyamines and polyethers in a degradation reaction catalysed by a catalyst complex in solid form, wherein a carrier liquid acts as a reactant in the degradation reaction, which catalyst complex is a complex of magnetic nanoparticles and bonded thereto a plurality of catalytic groups comprising a bridging moiety and a catalyst entity, wherein the bridging moiety comprises a functional group for adhesion or bonding to the nanoparticle and a linking group towards the catalyst entity, and wherein the catalyst entity comprises a positively charged aromatic heterocycle moiety, and a negatively charged moiety for balancing the positively charged aromatic moiety, which method comprises the steps of providing the catalyst complex as claimed in claim 1;
   providing the polymer to be degraded;
   mixing the catalyst complex, the polymer to be degraded, and the carrier liquid;
   carrying out the degradation reaction to obtain a mixture comprising monomer, oligomer, carrier liquid and catalyst complex;
   adding a polar medium, particularly water or an aqueous solution, to the mixture, to obtain a hydrophilic solution comprising monomer and a second phase comprising oligomers and catalyst complex; and
   separating the first aqueous phase from the second phase in a centrifuge.

10. The method as claimed in claim 9, wherein the addition of a polar medium leads to precipitating of the oligomers, wherein a first additive initially present in the polymer material enters the second phase.

11. The method as claimed in claim 10, wherein a second additive initially present in the polymer material remains in the hydrophilic solution and is subsequently removed by adsorption.

12. The method as claimed in claim 11, wherein monomer is separated from the hydrophilic solution by means of crystallisation downstream of the adsorption of the second additive.

13. The method as claimed in claim 9, wherein the hydrophilic solution is purified by membrane filtration to remove any remaining solid particles, particularly upstream of adsorption of the second additive.

14. The method as claimed in claim 10, wherein the second phase is washed with a washing agent.

15. The method as claimed in claim 10, wherein the first additive and any second additive are colorants.

16. The method as claimed in claim 10, wherein the second phase is redispersed and wherein the magnetic nanoparticles are separate from other particulate manner by application of an external magnetic field.

17. The method as claimed in claim 9, wherein the condensation polymer material is polyethylene terephthalate.

18. The method as claimed in claim 9, wherein the condensation polymer material is a waste material further comprising one or more additives.

19. The composition as claimed in claim 8, wherein at least one of the alkanediol or the alkanetriol comprises at least one of glycol, glycerol, or propylene glycol.

20. The method as claimed in claim 14, wherein the second phase is washed with a washing agent after a plurality of cycles to remove the first additive.

21. The method as claimed in claim 15, wherein the colorants comprise a pigment or a dye.

* * * * *